(12) United States Patent
Circenis

(10) Patent No.: US 8,463,578 B2
(45) Date of Patent: *Jun. 11, 2013

(54) HARDWARE BASED UTILIZATION METERING

(75) Inventor: Edgar Circenis, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1497 days.

This patent is subject to a terminal disclaimer.

(21) Appl. No.: 10/892,231

(22) Filed: Jul. 16, 2004

(65) Prior Publication Data

US 2004/0249601 A1 Dec. 9, 2004

Related U.S. Application Data

(63) Continuation of application No. 10/200,175, filed on Jul. 23, 2002, now Pat. No. 6,816,809.

(51) Int. Cl.
*G04F 1/00* (2006.01)

(52) U.S. Cl.
USPC .......................... 702/178; 702/176; 713/323

(58) Field of Classification Search
USPC ................ 702/176–178, 186, 182; 710/107, 710/260, 241, 100; 709/104, 102, 103, 106, 709/226, 208; 714/31, 32, 1; 713/300, 320, 713/322–324, 600–601
See application file for complete search history.

(56) References Cited

U.S. PATENT DOCUMENTS

| 4,503,495 | A | * | 3/1985 | Boudreau ...................... 710/241 |
| 4,924,428 | A | * | 5/1990 | Vea .................................. 714/1 |
| 5,654,905 | A | | 8/1997 | Mulholland |
| 5,920,689 | A | | 7/1999 | Berry et al. |
| 6,049,798 | A | * | 4/2000 | Bishop et al. ................... 707/10 |
| 6,405,299 | B1 | | 6/2002 | Vorbach et al. |
| 2006/0136930 | A1 | * | 6/2006 | Kaler et al. ................... 718/105 |

FOREIGN PATENT DOCUMENTS

| EP | 0320329 | 6/1989 |
| JP | 60024655 | 2/1985 |

OTHER PUBLICATIONS

Search Report issued on Jan. 14, 2004 in counterpart foreign application in GB under application No. 0316794.7.

* cited by examiner

*Primary Examiner* — Jonathan C Teixeira Moffat
*Assistant Examiner* — Hien Vo

(57) ABSTRACT

A hardware based utilization metering device, and a corresponding method are used in a computer system having one or more central processor units (CPUs) to provide a measure of CPU utilization. The device includes a state indicator coupled to a CPU. The state indicator receives an indication when the CPU is in a first state, which may be a busy state. A counter coupled to the state indicator and coupled to a system clock, receives a measure of system time from the system clock and receives data related to the indication when the CPU is in the first state, and generates a counter value indicative of time the CPU is in the first state. A data usage provider coupled to the counter maintains a non-volatile value of the counter value.

3 Claims, 6 Drawing Sheets

HARDWARE BASED UTILIZATION METERING

CROSS REFERENCE TO RELATED APPLICATION(S)

This application is a continuation of application Ser. No. 10/200,175, filed Jul. 23, 2002 now U.S. Pat. No. 6,816,809, entitled HARDWARE BASED UTILIZATION METERING, which is incorporated herein by reference in its entirety.

TECHNICAL FIELD

The technical field is pay-per-use systems and methods that use central processor metering to determine processor utilization for billing and other purposes.

BACKGROUND

Many computer system users are turning to a pay-per-use concept in which the user is billed based on some measure of processor utilization within the computer system.

A measure of processor utilization may be based on a metering scheme that determines when a processor is in use. Such metering of processor utilization is currently accomplished by software running within the computer system's operating system. In a computer system having hardware that may be partitioned, gathering processor utilization data from a hardware system requires communications between the metering application and all operating systems running within the hardware. The need for communication with different operating systems poses significant challenges because operating systems by their design are separated from other operating systems and do not have visibility to utilization data from other operating systems. Furthermore, the way partitioned systems are deployed, network connectivity may not be possible between different operating systems on the same hardware, further complicating the ability to accurately measure processor utilization. Current solutions involve communicating with each operating system independently, and then aggregating the information at a later time. This solution may be troublesome when network access is restricted, agent software is not installed, and operating systems are temporarily out of service, for example. This solution also requires the development of operating system-specific agents because each partition is capable of running different instances of the operating systems. In particular, since operating systems within a partionable computer system do not, by default, communicate with each other, data providers (software agents) are needed to run on each operating system to collect and transmit, or otherwise provide utilization data from each partition. The thus-collected utilization data are aggregated to provide an overall value for processor utilization.

SUMMARY

What is disclosed in a device for metering processor utilization. The device includes an idle indicator coupled to a processor. When the processor is idle, the idle indicator provides an idle signal and when the processor is busy, the idle indicator provides a busy signal. The idle indicator includes means for reading when the processor is idle.

Also disclosed is a system that measures processor utilization in a multi-processor environment having multiple of processors arranged in two or more cells of processors. The system includes, for each cell, an idle indicator for each processor in the cell and the idle indicator includes means for reading when the processor is idle. The system also includes, for each cell, a counter couple to each idle indicator, and coupled to a system clock, and the counter includes means for determining a percentage of time the processor is idle. Finally, the system includes a usage data provider including means for storing the idle time percentage for each processor in the two or more cells.

Finally, what is disclosed is a system that measures processor utilization in a multi-processor environment having multiple processors arranged in two or more cells of processors. The system includes an idle indicator for each processor in each cell, the idle indicator including means for reading when the processor is idle; means for determining a percentage of time the processor is idle; and means for storing the idle time percentage for each processor in each of the cells.

DESCRIPTION OF THE DRAWINGS

The detailed description will refer to the following figures, in which like numbers refer to like elements, and in which.

DETAILED DESCRIPTION

Figure 1A:
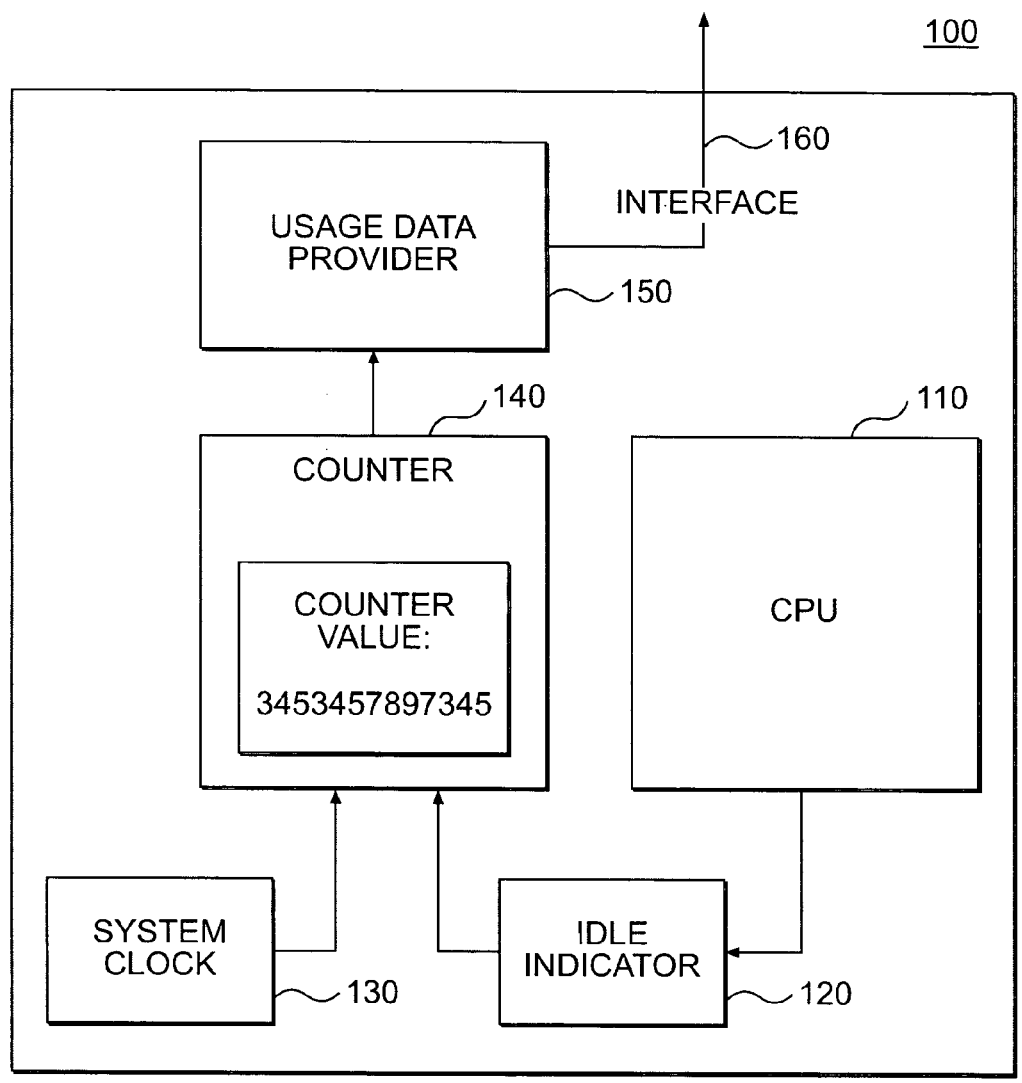
FIG. 1A is a basic block diagram of a system that meters CPU utilization data in a computer system running multiple instances of operating systems.

Pay-per-use systems allow computer users to acquire a given computing capacity that may be tailored to the user's specific need by, among other things, charging the user only for actual utilization of the system central processor units (CPUs). A measure of CPU utilization may be based on a metering scheme that determines when a processor is in use or busy. Such metering of CPU utilization is currently accomplished by software running within the computer system's operating system. This approach of CPU metering using software that runs within the operating system is acceptable for CPUs running single instances (i.e., type or version) of operating systems. For example, such a scheme would be acceptable for a computer system running only UNIX or only Windows®. However, for computer systems that may be hardware and software partitionable, gathering CPU utilization data from a hardware system requires communications between the metering application and all operating systems running within the hardware. The need for communication with different operating systems poses significant challenges because operating systems by their design are separated from other operating systems and do not have visibility to utilization data from other operating systems. Furthermore, the way partitioned systems are deployed, network connectivity may not be possible between different operating systems on the same hardware, further complicating the ability to accurately measure CPU utilization. Current solutions involve communicating with each operating system independently, and then aggregating the information at a later time. This solution may be troublesome when network access is restricted, agent software is not installed, and operating systems are temporarily out of service, for example. This solution also requires the development of operating system-specific agents because each partition is capable of running different instances of the operating systems. In particular, since operating systems within a partionable computer system do not, by default, communicate with each other, data providers (software agents) are needed to run on each operating system to collect and transmit, or otherwise provide utilization data from each partition. The thus-collected utilization data are aggregated to provide an overall value for CPU utilization.

The disclosed apparatus and method for collecting CPU utilization data overcomes these problems. The apparatus and method assume that a CPU may be in a first state or in a second state. The CPU utilization may be based on a measure of time that the CPU spends in one state or the other. In an embodiment, the first state may be a busy state, generally meaning the CPU is running processes that perform useful work for the user of the computer system. Alternatively, the first state may be an idle state wherein the CPU is not performing useful work. The CPU utilization may be based on detecting or determining when the CPU is in the first state. In the embodiment in which the first state is the busy state, the apparatus may include means for determining if the CPU is busy. The means for determining if the CPU is busy may include hardware means. Alternatively, the means for determining if the CPU is busy may include software means. The apparatus also includes means for measuring and providing system time, and means for combining the system time and CPU busy indication to provide a CPU utilization value. In an embodiment, the CPU utilization may be a counter value. For example, a counter may increment by 1 for each system clock cycle that the CPU is not in an idle state. The hardware means for determining if the CPU is busy may include hardware modifications to the computer system. The alternate software means for determining if the CPU is idle may include modifications to the CPU's operating system(s). The apparatus may further include means for storing a non-volatile version of the CPU utilization value, means for initializing the CPU utilization value upon power up of the CPU, and means for reporting the CPU utilization value to a system or network external to the computer system.

FIG. 1A is a basic block diagram of a computer system 100 that implements hardware based utilization metering. The system 100 includes a CPU 110 on which multiple instances of operating systems may run. That is, the CPU 110 may support different types of operating systems (e.g., UNIX, Windows®), and different versions of a specific type of operating system. Coupled to the CPU 110 is an idle indicator 120. The idle indicator 120 is capable of providing either an "idle" indication or a "not-idle"/"busy" indication. In an embodiment, the idle indicator 120 provides an output that indicates if the CPU 110 is "idle." The operation and structure of the idle indicator 120 will be described later. The output of the idle indicator 120 is provided to a counter 140. The counter 140 also receives an output from a system clock 130. The system clock 130 may measure ticks or cycles, or any other measure of system time, and then provide this data, or a modified form of the system time data, to the counter 140.

Using the inputs from the system clock 130 and the idle indicator 120, the counter 140 measures CPU cycles for the CPU 110, where the CPU 110 is not in an idle state, but instead is performing a service for the user of the system 100. While the CPU 110 is powered on, the counter 140 may thus maintain a counter value as shown in FIG. 1A, with the counter value (e.g., CPU cycles) updated based on the system time data and the idle indicator output.

The counter value is provided from the counter 140 to a usage data provider 150. The counter value may be provided to the usage data provider 150 on a periodic basis or when the counter 140 is polled by the usage data provider 150. The usage data provider 150 tracks the counter value and maintains a non-volatile master copy of the counter value. When the CPU 110 is powered on (or a hardware component containing the CPU 110 is powered on), the saved non-volatile counter value is provided from the usage data provider 150 to the counter 140 to initialize the counter value in the counter 140. Because the usage data provider 150 maintains a non-volatile copy of the counter value, even if the CPU 110, or other hardware component is removed, in addition to a loss of power situation, an up-to-date, or nearly up-to-date value of the counter value is always available.

The usage data provider 150 maintains a connection, or network interface 160 to a system or network (not shown) that is external to the computer system 100. For example, the interface 160 may be a local area network (LAN) interface to a LAN. The LAN may include a management server that receives and processes information from the various computer systems coupled to the LAN, including the counter values that indicate CPU utilization. The usage data provider 150 can provide the current value of the counter value to the network by way of the network interface 160. The counter value may be provided periodically or when polled by the network.

As noted above, the idle indicator 120 provides an indication that the CPU 110 is not idle. The idle indicator may be implemented as a hardware modification to the computer system 100. For example, some CPUs include a pin on the CPU chip that provides a halt (idle) indication. Some operating systems halt the CPU when the CPU is not processing commands (i.e., the CPU is idle), and a halt (idle) indication (i.e., a high or low, or 0 or 1, value) may be asserted at the pin. In an embodiment, the idle indicator 120 may be coupled to the pin to read the halt (idle) indication. Other operating systems do not halt the CPU when the CPU is idle. Instead, the operating system may place the CPU into an idle loop, where the CPU remains until the operating system requires CPU processing. In an embodiment, a change to the operating system may be made such that upon entry into the idle loop, an externally visible register value is set to indicate the CPU is idle. When the CPU exits the idle loop, the register would be cleared. In addition to the just-described two embodiments of the idle indicator 120, other structures and methods may be used to indicate the CPU 110 is idle.

Figure 1B:
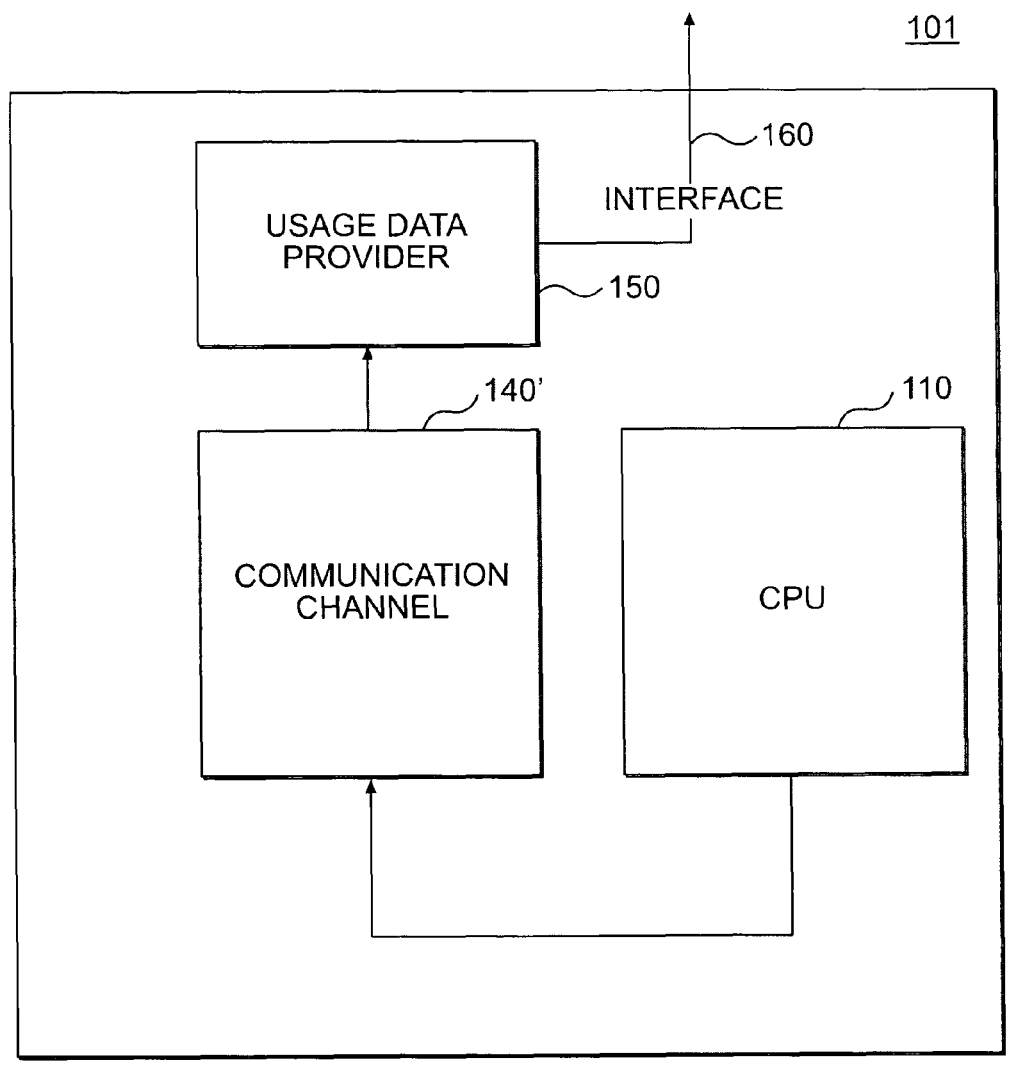
FIG. 1B is a basic block diagram of an alternate system that meters CPU utilization data in a computer system running multiple instances of operating systems.

FIG. 1B shows an alternative 101 to the embodiment to the hardware based utilization metering components shown in FIG. 1A. In FIG. 1B, the CPU 110 may run an operating system having a communications channel 140' to the usage data provider 150. The communication channel 140' may be used to communicate CPU utilization metrics for collection by the usage data provider 150. In this embodiment, hardware modification to meter the CPU 110 directly would not be required.

Figure 1C:
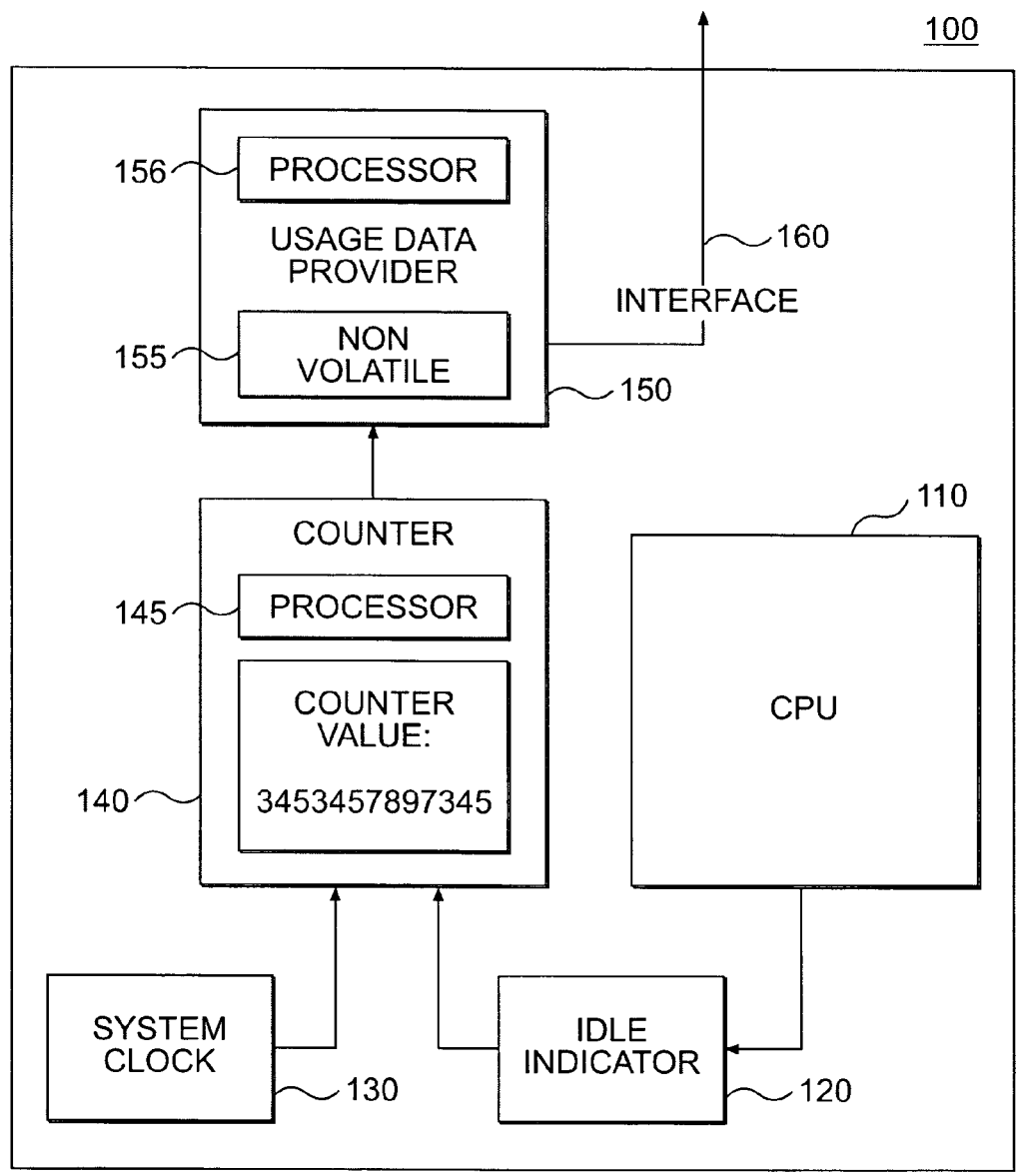
FIG. 1C is a more detailed block diagram of specific components of the system of FIG. 1A.

FIG. 1C shows selected components of the hardware based utilization metering device in more detail. In FIG. 1C, the counter 140 is shown including an optional processor 145 that may be used to process the idle indication and system time data to produce a CPU utilization metric in addition to the counter value. For example, the processor 145 may compute cumulative real or system time the CPU 110 is not idle. The usage data provider 150 is shown including a non-volatile storage 155 that stores the received counter value from the counter 140. The non-volatile storage 155 may be any non-volatile storage device that is capable of receiving and storing the counter values. The usage data provider 150 may also include an optional processor 156 that may be used to convert the received counter value into a CPU metric such as total CPU non-idle hours, in real time, for example. The processor 156 may also handle requests for the utilization data over the interface 160 or for periodically transmitting utilization data to an external system on the LAN connected to the interface 160.

Figure 2:
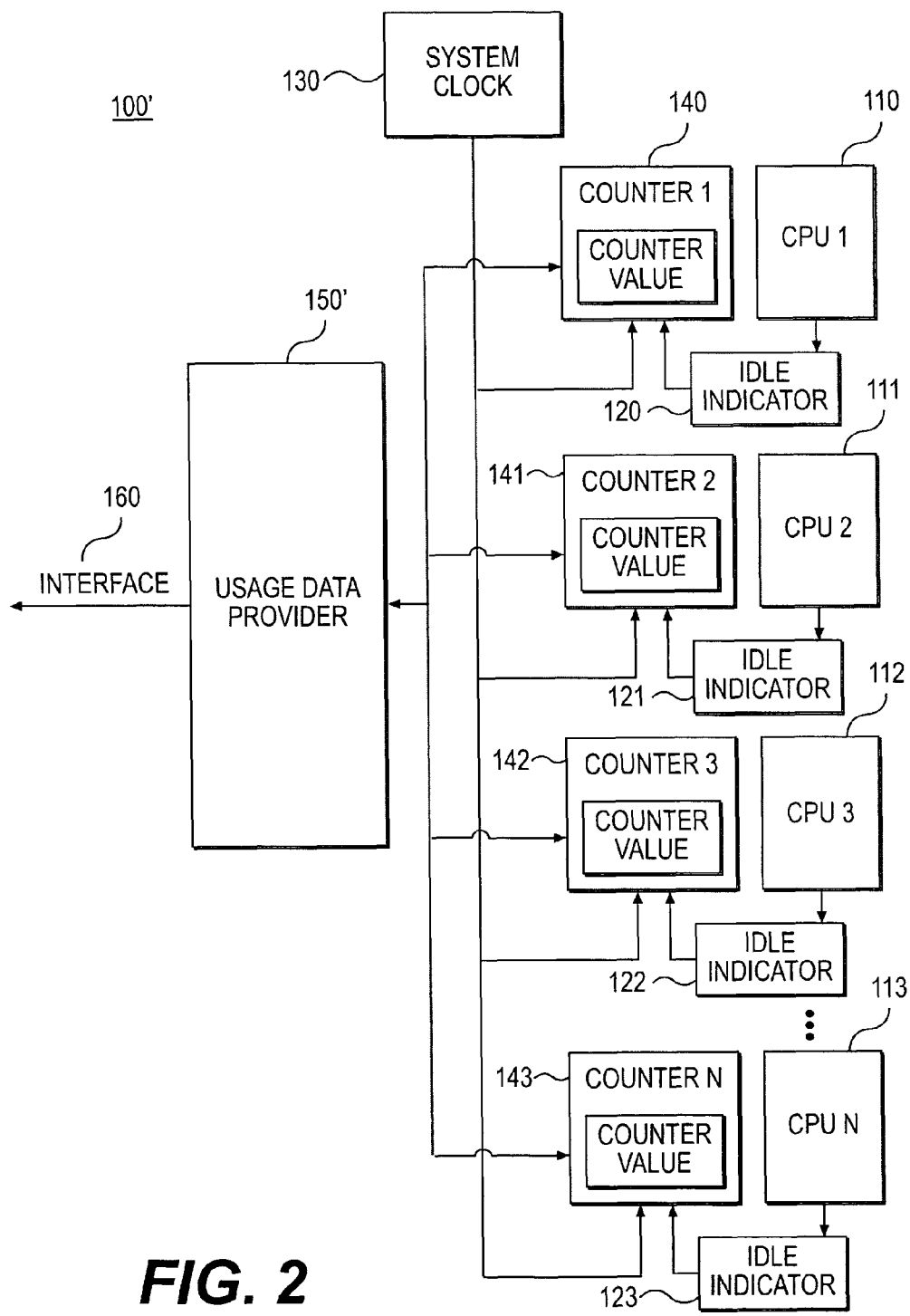
FIG. 2 is a further block diagram of a system that meters CPU utilization data in a computer system having multiple CPUs running multiple instances of operating systems.

FIG. 2 is a block diagram of a computer system 100' that meters CPU utilization data where the computer system 100' includes multiple CPUs running multiple instances of operating systems. In FIG. 2, the computer system 100' includes CPU 1 through CPU N (denoted as 110-113). This arrangement is meant to indicate that the computer system 100' may include N CPUs, where N is an integer. Associated with each of the CPUS 110-113 is a corresponding idle indicator (120-123, respectively) and a corresponding counter (140-143, respectively). Each of the counters 140-143 receives an input from its respective idle indicator and from the system clock 130. The system clock 130 shown in FIG. 2 performs the same functions, and has the same structure, as the system clock 130 shown in FIG. 1A. Each of the counters provides an output (counter value for its respective CPU) to a usage data provider 150'. The usage data provider 150' is similar to the usage data provider 150 shown in FIG. 1A, except that the usage data provider 150' maintains a non-volatile measure of the counter value for each of the CPUs 110-113 in the computer system 100'. Finally, the computer system 100' includes the interface 160 for communicating CPU utilization data (counter values) to a system or network (not shown) external to the computer system 100'.

Figure 3:
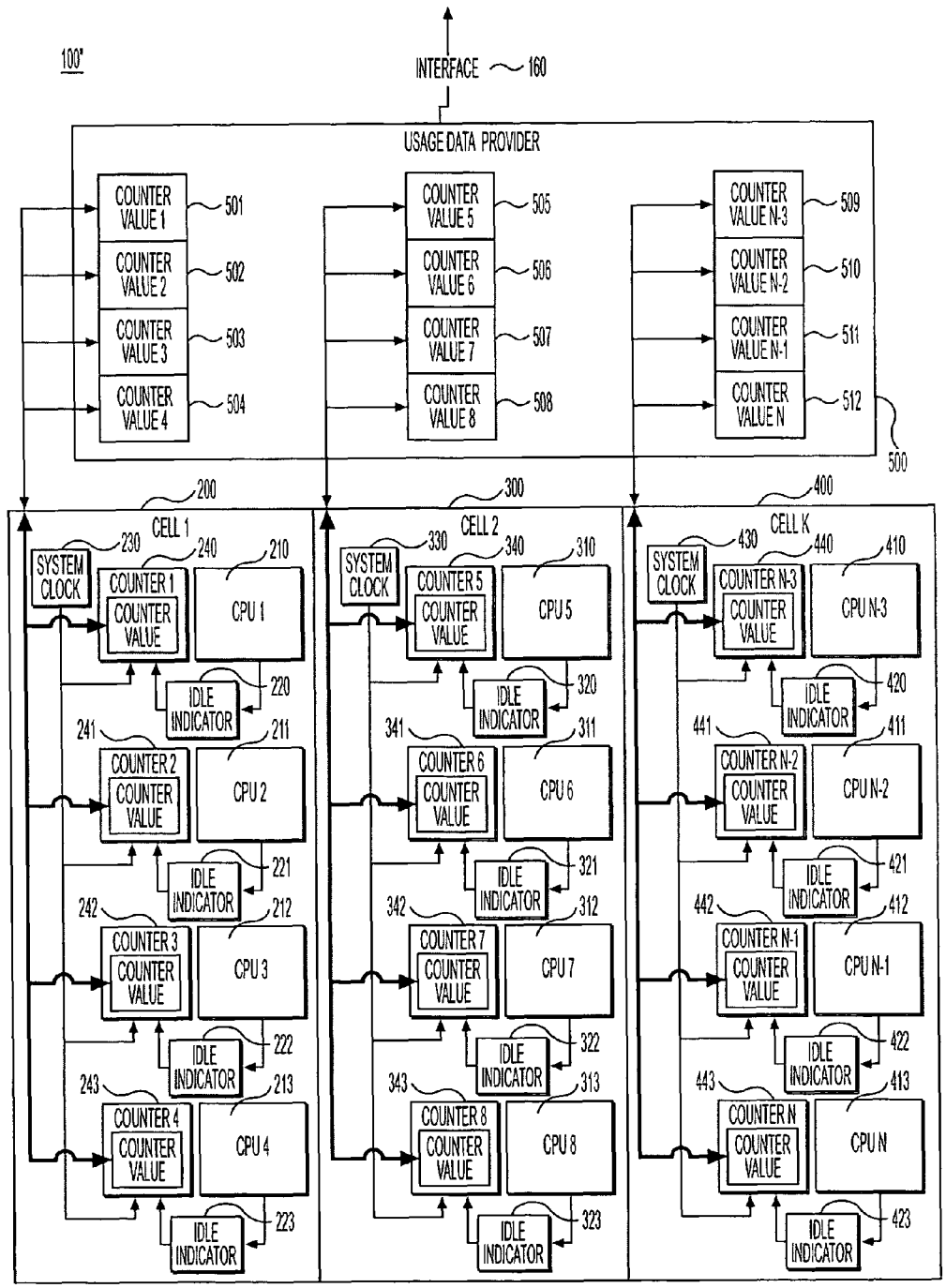
FIG. 3 is yet a further block diagram of a system that meters CPU utilization data in a computer system having multiple CPUs running multiple instances of operating systems.

FIG. 3 is a block diagram of a computer system 100" having multiple CPUs arranged in partitions or cells. One or more of the CPUs may run multiple instances of operating systems, or, certain CPUs may run specific instances of operating systems while other CPUs run other instances of operating systems. As shown in FIG. 3, the computer system 100" includes hardware cells 1 though K, denoted as cells 200, 300, and 400, respectively. This arrangement is meant to indicate that the computer system 100" may include K cells, where K is an integer, including 1 (one), indicating the computer system 100" comprises one cell. Each of the cells is a set of components that can be removed from the computer system 100" as a group. As can be seen in FIG. 3, the arrangement of components within each cell is identical in terms of type and number of components. However, the cells need not include the same type or same number of components. In addition to division of components among the hardware cells 1 through K, the components may be partitioned, or logically sorted. The partitions may comprise any number of CPUs or any number of cells. For example, cell 1 (200) may comprise four separate partitions, one for each of the CPUs installed in cell 1. Alternatively, cell 1 (200) and cell 2 (300) may comprise a first partition and the remaining cell(s) may comprise additional partition(s).

Taking the cell 200 as an example, there are included four CPUs 210-213. However, the cell 200 may include more or fewer than four CPUs. Associated with each of the CPUs 210-213 is a corresponding idle indicator 220-223. Each of the idle indicators receives an indication when its associated CPU is idle, and provides an output to a corresponding counter 240-243 that provides a current counter value (CPU utilization metric). Each of the counters 240-243 receives an input from a system clock 230. The system clock 230 functions in the same manner as the system clock 130 shown in FIG. 1A.

Each of the counters 240-243 provides its associated counter value to a usage data provider 500. The usage data provider 500 maintains a copy of the counter value (shown in FIG. 3 as 501-512, respectively) for each of the CPUs in the cells 200, 300 and 400. The usage data provider 500 includes the interface 160 to a system or network (not shown) external to the computer system 100".

The arrangement of the cells 200, 300, and 400 allows one or more of the cells to be removed from the computer system 100" while maintaining the computer system in operation. To prevent loss of the counter values for the CPUs in a removed cell, the counter values are stored in the usage data provider 500. In an embodiment, the stored counter values may be maintained in non-volatile storage. In operation, the counter values that are closest to the CPUs (i.e., the counter values in the counters) are incremented, and the counter values in the usage data provider 500 are periodically updated. The counter values may be updated based on a specific reporting interval, or by a polling action initiated by the usage data provider 500.

Should one of the cells 200, 300 or 400 be replaced with a new cell, or with the original cell, but with one or more new CPUs, the counter values may be lost when the cell is powered off. Thus, whenever a cell is powered on, the usage data provider 500 will reinitialize the corresponding counters in the cell. For example, if the cell 200 is removed, and the CPU 210 is replaced with a new CPU 210', then when the original cell 200 is reinstalled and powered on, the usage data provider 500 will provide the stored counter value 501 to the counter 240. The usage data provider 500 will also initialize the counters 241-243 by providing the stored counter values 502-504, respectively. Because the CPU 210 was replaced by the new CPU 210', the provided counter value 501 will reflect the CPU utilization for the CPU 210. Subsequent non-idle time of the CPU 210' will be counted by incrementing the counter 240.

In the above example, the replacement CPU 210' is similar in all respects to the original CPU 210, so that incrementing the counter 240 with the new CPU 210 installed should proceed the same as with the original CPU 210. However, the new CPU 210 may also differ in some respects from the original CPU 210, In an embodiment, the apparatus and method for metering CPU utilization may include the necessary means for accounting for differences between CPUs. For example, a processor in the counter 240 (similar to the processor 145 shown in FIG. 1C) or a processor in the usage data provider 500 (similar to the processor 156 shown in FIG. 1C) may adjust the cumulative counter value for CPU 210 should CPU 210 be replaced with a different type or model CPU, or should the system clock 230 change clock rate, or should an operating system running on the CPU 210 change such that determination of the counter value previously determined at the counter 240 would change. For example, should the system clock 230 be replaced with a system clock having a higher clock rate than that of the original system clock 230, the processor in the counter 240 could simply multiply the determined counter value by the ratio of the original clock rate to the new clock rate to produce a consistent rate of change in the counter value from that determined using the original clock rate and that determined using the new clock rate.

Figure 4:
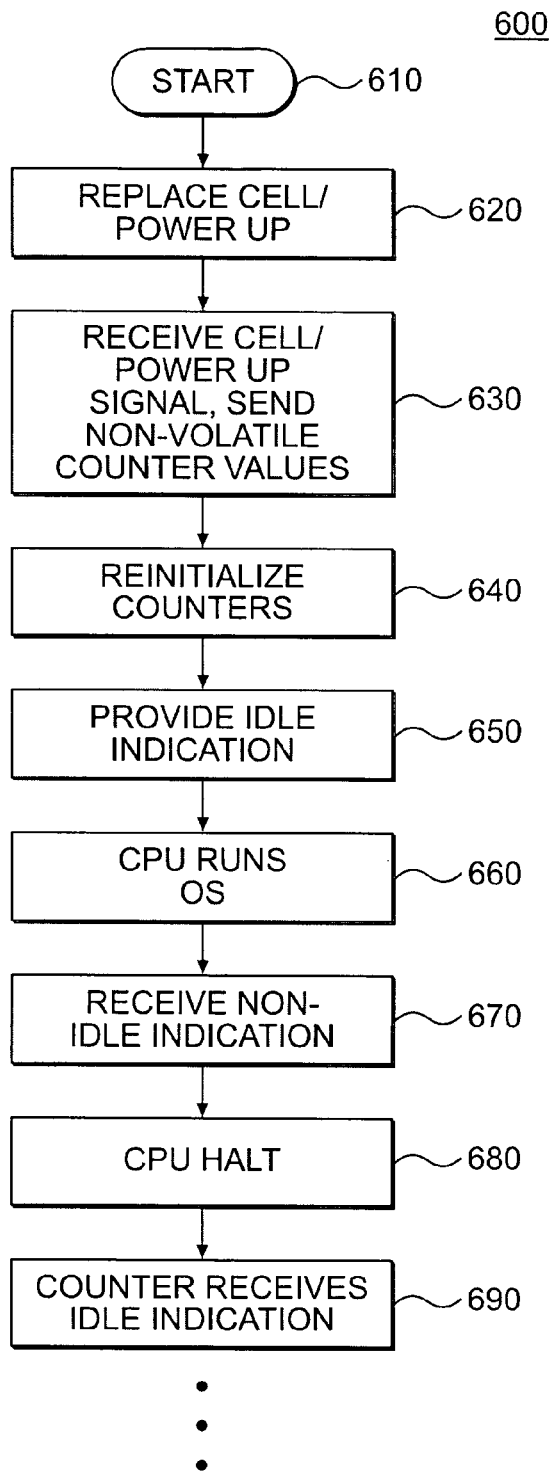
FIG. 4 is a block diagram of a method for metering CPU utilization in a computer system having multiple CPUs running multiple instances of operating systems.

FIG. 4 is a flow chart showing a hardware based CPU utilization operation 600 using the system 100" of FIG. 3. The operation 600 starts in block 610. In block 620, the cell 200 is replaced and the hardware components on the cell 200 are powered up. In block 630, the usage data provider 500 receives an indication of the power up of the cell 200 components, and the usage data provider 500 sends the stored counter values 501-504 to the counters 240-243, respectively. In block 640, the received counter values are used to reinitialize the counters 240-243. However, the CPUs 210-213 are idle (operating systems are not processing), and in block 650, the idle indicators 220-223 provide an idle indication to their respective counters 240-243, thereby preventing incrementing of the counter values. In block 660, the CPU 210 begins running an operating system, and the idle indicator 220 sends an indication to the counter 240 that the CPU 210 is not idle. In block 670, the counter 240 receives the non-idle indication, and the system time from the system clock 230, and begins incrementing the counter value for the CPU 210. In block 680, the operating system running on the CPU 210 stops processing, halts the CPU 210, and asserts a halt indication. In block 690, the counter 240 receives an idle indication and stops incrementing the counter value. The operation 600 may continue with incrementing counter values for other CPUs in the system 100" and may include routines to update the non-volatile counter values in the usage data provider 500.

The invention claimed is:

1. A system that measures processor utilization in a multi-processor environment having a plurality of processors arranged in plural cells of processors, the system comprising:
for each cell, for each processor in the cell, a respective idle indicator configured to provide one of a constant high signal and a constant low signal when the processor is an idle state and to provide the other of said constant high signal and said constant low signal when the processor is in a busy state, and
a counter coupled to each idle indicator, and coupled to a system clock, the counter including means for determining a percentage of time the processor is idle; and
a usage data provider including means for storing the idle time percentage for each processor in the two or more cells.

2. A system that measures processor utilization in a multi-processor environment having a plurality of processors arranged on two or more cells of processors, the system comprising:
an idle indicator for each processor in each cell, the idle indicator including means for reading when the processor is idle;
means for determining a percentage of time the processor is idle, said determining means including
a system clock that provides processor time, and
a counter that counts system time from the system clock when the processor is idle;
means for storing the idle time percentage for each processor in each of the cells, said storing means including
memory in the counter that stores a current counter value; and
memory in the usage data provider that stores counter values for each of the processors, wherein the counter values are updated periodically;
a usage data provider that receives a measure of the processor utilization; and
means for reinitiating a processor counter value following one of a power loss in a cell and replacement of an original processor with a replacement processor.

3. The system of claim 2, further comprising means for accounting for differences between the original processor and the replacement processor.

* * * * *

UNITED STATES PATENT AND TRADEMARK OFFICE
CERTIFICATE OF CORRECTION

| | | |
|---|---|---|
| PATENT NO. | : 8,463,578 B2 | Page 1 of 1 |
| APPLICATION NO. | : 10/892231 | |
| DATED | : June 11, 2013 | |
| INVENTOR(S) | : Edgar Circenis | |

It is certified that error appears in the above-identified patent and that said Letters Patent is hereby corrected as shown below:

In the Claims:

In column 7, line 30, in Claim 1, delete "an" and insert -- in an --, therefor.

Signed and Sealed this
Third Day of September, 2013

Teresa Stanek Rea
*Acting Director of the United States Patent and Trademark Office*